Oct. 20, 1959  D. J. BROWN ET AL  2,909,332
VACUUM MILLING AND DEAERATING SYSTEM
Filed Nov. 5, 1954  2 Sheets-Sheet 1

GLENN H. MOREHOUSE
LAWRENCE B. SCHAUER
DONALD J. BROWN
INVENTOR

BY
ATTORNEY

Oct. 20, 1959     D. J. BROWN ET AL     2,909,332
VACUUM MILLING AND DEAERATING SYSTEM
Filed Nov. 5, 1954     2 Sheets-Sheet 2

GLENN H. MOREHOUSE
LAWRENCE B. SCHAUER
DONALD J. BROWN
INVENTOR

BY

ATTORNEY

United States Patent Office 2,909,332
Patented Oct. 20, 1959

2,909,332

VACUUM MILLING AND DEAERATING SYSTEM

Donald J. Brown and Glenn H. Morehouse, Los Angeles, and Lawrence B. Schauer, Pasadena, Calif., assignors, by mesne assignments, to Morehouse Industries, Inc., Los Angeles, Calif., a corporation of California Application November 5, 1954, Serial No. 467,098

8 Claims. (Cl. 241—46)

This invention relates to a system for the preparation of products which require a grinding, comminuting or mixing in their preparation, wherein the entrainment of gases is prevented and also wherein previously entrained gases are removed.

In the preparation of aqueous products solids are ground in the presence of a liquid. For example, a fruit nectar may be prepared by subjecting a fruit to a grinding action so that all of the materials intermixed with the liquid are reduced to very fine size, the product being thereby given a creamy consistency. Oleaginous products are also prepared by subjecting the oils or greases and the materials to be combined therewith to a grinding action in a mill whether the products being prepared are aqueous or oleaginous in their nature, there is ordinarily an entrainment of gas, for example, air, during and as the result of the grinding process. The entrainment of gas in the aqueous products is harmful, and in the preparation of oleaginous products by milling, the entrainment of air may result in a large increase in the bulk of the product. It is an object of the present invention to provide a system and method for the preparation of products which require a grinding action. Herein the term grinding is used in its broader sense as meaning the reduction in size of solids or semisolids entering into the product and the thorough intermixing of the same with the aqueous or oleaginous vehicle of the product.

It is an object of the invention to provide a system including a grinder which receives the product to be prepared by grinding action, a means for applying a suction to the outlet of the chamber of grinder which is made airtight so that air cannot enter thereinto, and flow restricting or controlling means connected to the inlet of the grinding chamber so that the feeding of the product to be milled is accomplished in such a manner that a partial vacuum is maintained in the grinding chamber. In this system entrained gases are removed from the constituent parts of the product and entrainment of gases in the product is prevented.

It is an object of the invention to provide a system including a substantially airtight grinder having an inlet and an outlet, with a gear pump connected to the outlet so as to continuously withdraw the milled product from the grinder chamber, and a gear pump connected to the inlet of the chamber through which the product to be milled passes to the chamber, there being means for controlling operation of the gear pump so as to cause the gear pump to admit the product to be milled to the chamber of the mill at a rate which is less than the rate at which the suction gear pump is capable of withdrawing fluids from the outlet of the chamber, the result being that a partial vacuum is maintained in the system between the inlet gear pump and the suction gear pump, to maintain in the chamber of the mill a condition of partial vacuum in which the milling operation takes place.

Further objects and advantages of the invention may be brought out in the following part of the specification wherein small details of a preferred form of the invention have been described for the purpose of making a complete disclosure, without the intention of limiting the scope of the invention set forth in the appended claims.

Referring to the drawings which are for illustrative purposes only:

Figure 1:
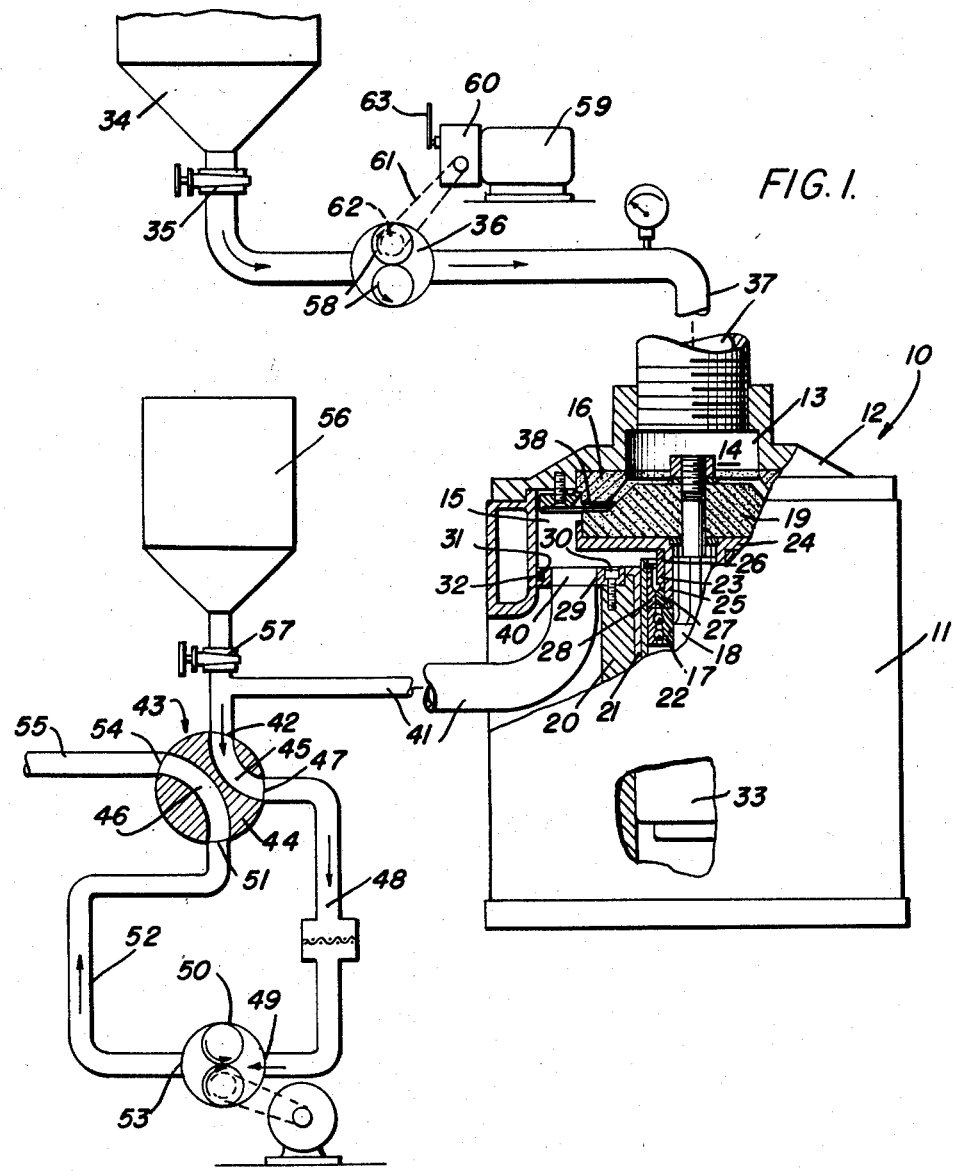
Fig. 1 is a schematic view showing a preferred form of our system.

As shown in Fig. 1, we provide a grinder 10 having a lower part 11 and an upper part 12 defining a grinding chamber 13 having an inlet space 14 and an outlet space 15, the upper part 12 supports therein a stationary annular grinding element 16 and the lower part 11 supports a bearing 17 which carries a vertical shaft 18 which projects upwardly into the grinding chamber 13 and supports therein a rotating grinding element 19 to cooperate with the stationary grinding element 16. The bearing 17 is supported within a vertical tubular wall 20, forming a portion of the lower part 11, by cylindrical sleeve elements 21 and 22, there being a sealing means 23 to seal around the shaft 18 in a manner to prevent entry of air from the exterior into the grinding chamber 13.

The rotating grinding element 19 is supported upon a circular plate 24 having a cylindrical hub 25 which projects downwardly around the upper portion of the shaft 18. The sealing means 23 consists in part of a ring 26 which is fixed on the hub 25 so as to rotate therewith, and a non-rotating ring 27 which is supported below the ring 26 by a cylindrical insert 28 arranged within the sleeve member 22 above the bearing 17. The lower part of the outlet space 15 of the chamber 13 is closed by a ring 29 secured by screws 30 and having in the periphery thereof a groove 31 to receive a sealing ring 32. The shaft 18 is driven by a motor 33 at high velocity.

The product to be milled is disposed in a hopper 34 and the lower part of this hopper 34 is connected through a valve 35 and a flow controlling or restricting means 36 with the inlet 37 of the grinding chamber 13. From the inlet space 13 of the chamber 14 the product passes through the narrow space 38 between the grinding elements 16 and 19 which are ordinarily made from stone especially selected for this purpose. The milled product passes into the outlet space 15 of the chamber 13 and from this space passes through an outlet 40 in the ring 29 through a duct member 41 to a valve port 42 of a multiple passage valve 43 which is schematically shown as having a valve body 44 with passages 45 and 46 therein. The valve 43 is of a type disclosed in copending application, Serial No. 357,204, filed May 25, 1953, now Patent No. 2,741,326. This valve device has a port 47 which is connected through a duct member 48 with the inlet port 49 of a gear pump 50 such as disclosed in said copending application. The valve device 43 has a port 51 which is connected through a duct member 52 with the outlet port 53 of the pump 50, and the valve device also has a discharge or outlet port 54 which is connected to a duct member 55 which carries the finished, deaerated product to selected receivers, such as drums, storage vats, etc. The outlet duct 41 which leads from the grinding or milling chamber 13 is also connected to an auxiliary reservoir 56, this connection being made through a valve 57.

The flow restricting, metering or controlling means 36, in the preferred form of the invention, consists of a gear pump having meshed gears 58, the rotation of which is controlled by an electric motor which acts through a variable speed gear 60 to drive a chain 61 which runs over a sprocket 62 fixed on one of the shafts of the pump 36. The gear 60 has means such as a handle 63 whereby it may be controlled so as to vary the rate of flow of the product through the pump 36 to the inlet 37 of the mill 10.

When the valve 43 is adjusted as shown in Fig. 1, the operation of the pump 50 will create a suction in the duct members 48 and 41 tending to withdraw fluid or the milled product through the outlet opening 40 of the mill 10, at a rate which is determined by the size and speed of operation of the pump 50. The pump 36, being connected to the motor 59, is capable of being adjusted so that the rate of flow therethrough of the product to be milled is less than the rate of flow of which the pump 50 is instantly capable. This results in the creation of a partial vacuum in the system between the pump 36 and the pump 50. It may be said that the suction pump 50 creates a partial vacuum in the milling chamber 12 and the pump 36 prevents entry of air from the outside through the inlet 37 into the system, but at a controlled rate feeds the product to be milled to the inlet 37 of the mill 10.

Figure 2:
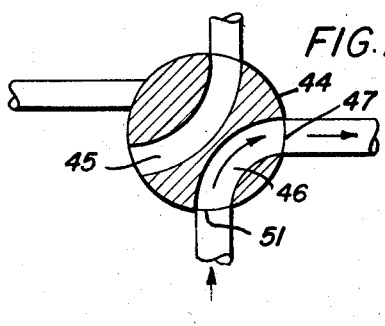
Fig. 2 is a fragmentary schematic view showing the control valve adjusted to another position.

When the valve body 44 is rotated into the position in which it is shown in Fig. 2, the passage 46 will directly connect the valve ports 51 and 47 so that there will be no flow of the finished product through the duct member 55, but the outlet port 53 of the pump 50 will be directly connected to its inlet port 49 for recirculation of the finished product during the time the discharge duct 55 is being connected to another receiver. At this time the valve 57 may be opened so that some of the milled product may pass into the auxiliary reservoir 56. When the valve body 44 is readjusted into the position in which it is shown in Fig. 1, the quantity of the product contained in the receptacle 56 may be returned into the system. At this time the valve 57 will be adjusted so that it will restrict the rate of flow of the product toward the valve port 42 so that the action of the suction pump 50 will create a partial vacuum in the system between the pump 36 and the pump 50.

Figure 3:
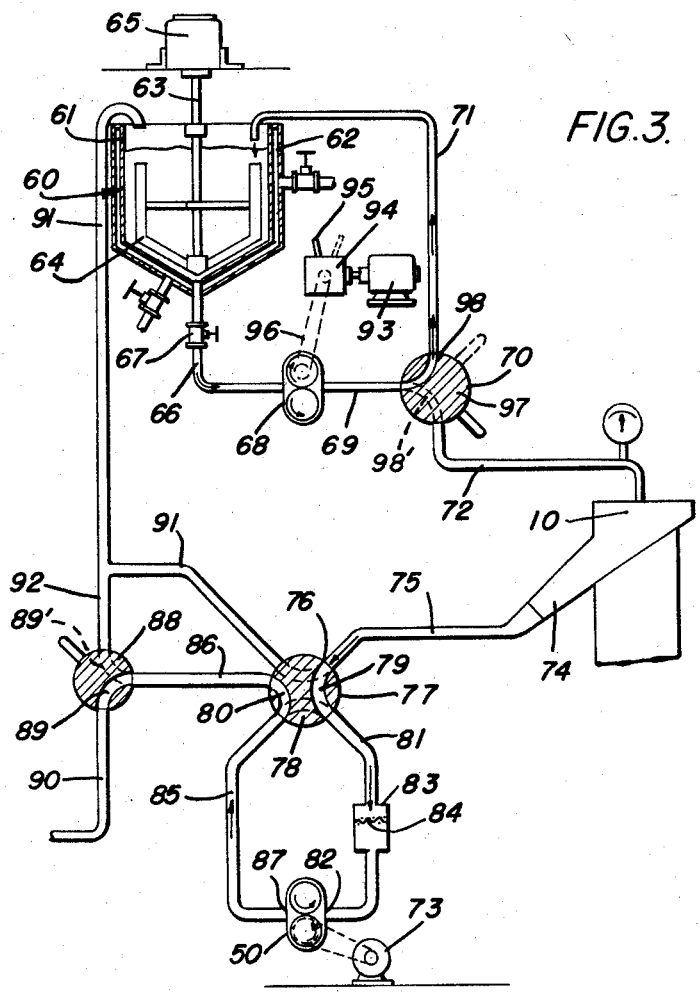
Fig. 3 is a schematic view of a form of the invention forming a complete grease making system.

In Fig. 3, I show the sealed mill 10 as part of a complete grease making system. Therein a mixing device 60 is provided for combining the ingredients prior to the milling and deaerating operations. It provides means for heating and mixing the components which enter into compounded greases such as metallic greases, metallic soap greases and lithium soap greases. A shell 61 is provided having a steam jacket 62 adapted to receive steam as a heating medium. A vertical shaft 63 extends down into the shell 61 and carries thereon mixing and scraper blades 64. The upper end of the shaft 63 is connected to a power source shown as a motor 65. An outlet pipe 66, having a valve 67 therein extends to the inlet of a gear pump 68. The outlet of the gear pump 68 is connected by a duct member 69 with a three-way valve 70. The upper outlet of the three-way valve 70 is connected to a return pipe 71 leading to the upper portion of the mixing device 60. The lower outlet of the three-way valve 70 is connected by a duct member 72 with the inlet of the sealed mill 10.

A suction pump 50 of herringbone gear type is provided having a motor 73 to drive the same. Means are provided whereby the outlet 74 of the mill 10 may be connected to the inlet of the suction pump 50 or to return piping leading to the mixing device, for recirculation of the milled product. From the outlet 74 of the mill 10 a duct 75 is extended to the port 76 of valve means 77 having a body 78 with passages 79 and 80 therein. When the body 78 is in the position in which it is shown in Fig. 3, the valve passage 79 connects the port 76 with a duct means 81 leading to the inlet 82 of the suction pump 50, the duct means 81 including a chamber 83 having therein a screen 84 through which the milled grease passes. At this time the valve passage 80 connects a duct member 85 with an outlet duct 86. The duct member 85 is connected to the outlet 87 of the suction pump 50, and the duct 86 is connected to the inlet port of a three-way valve 88 having a valve passage 89 arranged to be connected with a delivery pipe 90 as shown in full lines in Fig. 3.

Figure 4:
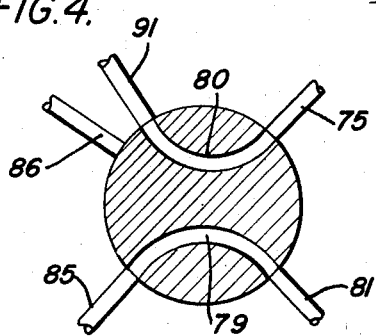
Fig. 4 is a fragmentary schematic view showing another position of one of the valves of the system shown in Fig. 3.

When the body 78 of the valve means 77 is rotated in clockwise direction through an angle of approximately 90°, the valve passage 79, as shown in Fig. 4, will connect the duct means 81 with the duct member 85, thereby connecting the outlet 87 of the suction pump 50 with its inlet 82. At the same time, as shown in Fig. 4, the valve passage 80 will connect the duct 75, which leads from the outlet 74 of the mill 10, with a duct member 91 which, as shown in Fig. 3, extends to the upper portion of the mixing device 60. Rotation of the body of the valve 88 in counterclockwise direction through an angle of substantially 90° will bring the valve passage 89 into a position 89′ wherein it will connect the duct member 86 with a duct member 92 which connects with the duct member 91.

The pump 68 is operated or controlled by a power source shown as an electric motor 93 which is connected to a variable speed drive 94 having control means including a lever 95. The transmission 94 is connected to the pump 86 through a chain and sprocket means 96.

The system disclosed in Fig. 3 may be operated as follows. The shell 61 is charged with the simple grease, soap and other substances which are to enter into the finished, milled greased product. The body 97 of the valve 70 is adjusted so that its valve passage 98 will connect the duct 69 with the return duct 71. The power source 65 is operated so as to rotate the blades 64 within the shell 61, and steam is delivered to the jacket 62 to provide heat for the mixing operation. The motor 93 is then operated to drive the pump 68 so that the partly mixed ingredients will be drawn from the bottom of the shell 61, and through the gears of the pump 68 and then returned to the shell 61 by the return duct 71. This procedure is carried on during the heating and mixing of the ingredients. A feature of the arrangement described is that the ingredients are acted upon by the gears of the pump 68 which serves to break up small lumps of the different ingredients so that a better and faster mixing thereof may be effected in the mixing device 60.

After the preliminary mixing and heating described in the foregoing, with the valve body 78 in the position in which it is shown in Fig. 3, the mill 10 and the pump 50 are set into operation. The body 97 of the valve 70 is then rotated in counterclockwise direction through an angle of substantially 90° so that the passage 98 thereof, as shown at 98′ will connect the duct 69 leading from the outlet of the pump 68 to the duct member 72 which is connected to the inlet of the mill 10. The handle 95 of the variable speed transmission 94 will be then adjusted rightwardly from the position in which it is shown in full lines to reduce the speed of the gears of the gear pump 68, so that the gear pump 68 will then serve as a valve means for controlling the rate of flow of the grease mixture through the duct member 72 to the inlet of the mill 10. The suction exerted by the pump 50 will, during the operation of this part of the process, draw the grease mixture through the mill at such rate with relation to the operation of the pump 68 that a state of partial vacuum will be established in the zone in which the milling operation is being performed and the desired deaerating effect will be attained. At this time the three-way valve 88 may be actuated so as to connect the delivery duct 86 with the duct member 92, so that the milled and deaerated grease will be delivered through a portion of the duct member 91, whereupon the grease may be subjected to further action in the mixing device 60 or may be again circulated through the system. Also, rotation of the body 78 of the valve 77 into the position thereof shown in Fig. 4 will connect the outlet duct 75 of the mill 10 directly with the return duct member 91, thereby making it possible to recirculate the grease product seriately through the mixer and the mill any selected number of times before subjecting the grease product to the final step of milling under vacuum and deaerating, which may be accomplished by operation of the motor 73 to drive the suction pump 50, adjustment of the valves 77 and 88 into the positions in which they are shown in Fig. 3 and adjustment of the flow rate of the pump 68 to a value less than the flow rate of the pump 50.

The milling of the product under partial vacuum effects the bursting of the air bubbles which are so small that they will not separate from the grease, so that the small bubbles are agglomerated into large bubbles or masses of air. Also, as the grease passes through the screen 84, air bubbles existing therein are broken so as to release therefrom the relatively small bodies of air which combine to form larger air masses as explained in U.S. Letters Patent No. 2,660,259, granted to Glenn H. Morehouse November 23, 1953. The bodies of grease and masses of air are consecutively drawn from the piping 81 and discharged through the piping 85 and 86. Upon reaching the open atmosphere the bodies of grease will drop into a suitable container provided therefor and the masses of air will pass into the atmosphere.

We claim:

1. In a milling and deaerating system: a mill having a closed milling chamber having an inlet and an outlet, and having a rotor in said chamber supported by a shaft and a seal around said shaft; a gear pump having its inlet connected to the outlet of said chamber for applying suction to the outlet of said chamber; an auxiliary reservoir between said chamber and said pump; multiple passage valve means disposed between said chamber and said pump arranged when in one of its positions to connect the inlet of said pump to the outlet of said chamber and to connect the outlet of said pump to outlet piping for the finished product, and when in another position to connect the outlet of said pump directly to its inlet; valve means operable to connect the outlet of said mill to said reservoir; a gear pump connected to the inlet of said chamber through which the product to be milled passes to said chamber; and means for controlling the operation of said last named gear pump so that it will act as a valve to restrict the flow of the product to be milled into said chamber to a rate less than the rate at which said first named gear pump is endeavoring to draw the product from the outlet of the chamber, thereby creating a vacuum in said system between said pumps and effecting removal of entrained gases from the product.

2. In a milling and deaerating system: a mill having a closed milling chamber having an inlet and an outlet, and having a rotor in said chamber supported by a shaft and a seal around said shaft; a gear pump for applying suction to the outlet of said chamber; multiple passage valve means connected to the outlet of said chamber and to the inlet and the outlet of said pump arranged when in one of its positions to connect the inlet of said pump to the outlet of said chamber and to connect the outlet of said pump to outlet piping for the finished product, and when in another position to connect the outlet of said pump directly to its inlet; a gear pump connected to the inlet of said chamber through which the product to be milled passes to said chamber; and means for controlling the operation of said last named gear pump so that it will act as a valve to restrict the flow of the product to be milled into said chamber to a rate less than the rate at which said first named gear pump is endeavoring to draw the product from the outlet of the chamber, creating a vacuum in said system between said pumps and effecting removal of entrained gases from the product.

3. In a milling and deaerating system: a mill having a closed milling chamber having an inlet and an outlet, and having a rotor in said chamber supported by a shaft and a seal around said shaft; a suction pump having its inlet connected to receive the milled material from the outlet of said chamber so that said pump will act to draw the milled product through said chamber outlet; metering means connected to the inlet of said chamber through which the product to be milled passes to said chamber; and means for controlling the operation of said metering means so that it will act as a valve to restrict the flow of the product to be milled into said chamber to a rate less than the rate at which said pump is endeavoring to draw the product from the outlet of the chamber, thereby creating a vacuum in said system between said metering means and said suction pump and effecting removal of entrained gases from the product.

4. An apparatus as recited in claim 3 wherein said suction pump comprises a gear pump and said metering means comprises a feed gear pump.

5. In a milling and deaerating system: a mill having a closed milling chamber having an inlet and an outlet, and having a rotor in said chamber supported by a shaft and a seal around said shaft; a gear pump having its inlet connected to the outlet of said chamber for applying suction to the outlet of said chamber; an auxiliary reservoir between said chamber and said pump; multiple passage valve means disposed between said chamber and said pump arranged when in one of its positions to connect the inlet of said pump to the outlet of said chamber and to connect the outlet of said pump to outlet piping for the finished product, and when in another position to connect the outlet of said pump directly to its inlet; valve means operable to connect the outlet of said mill to said reservoir; and means for restricting the flow of the product to be milled into said chamber to a rate less than the rate at which said gear pump is endeavoring to draw the product from the outlet of the chamber, creating a vacuum in said system between said pump and said flow restriction means and effecting removal of entrained gases from the product.

6. In a milling and deaerating system: a mill having a closed milling chamber having an inlet and an outlet, and having a rotor in said chamber supported by a shaft and a seal around said shaft; a gear pump having its inlet connected to the outlet of said chamber for applying suction to the outlet of said chamber; multiple passage valve means connected to the outlet of said chamber and to the inlet and the outlet of said pump arranged when in one of its positions to connect the inlet of said pump to the outlet of said chamber and to connect the outlet of said pump to outlet piping for the finished product, and when in another position to connect the outlet of said pump directly to its inlet; and means for restricting the flow of the product to be milled into said chamber to a rate less than the rate at which said gear pump is endeavoring to draw the product from the outlet of the chamber, creating a vacuum in said system between said pump and said flow restriction means and effecting removal of entrained gases from the product.

7. In a milling and deaerating system: a mill having a closed milling chamber having an inlet and an outlet; a gear pump having its inlet connected to the outlet of said chamber for applying suction to the outlet of said chamber; an auxiliary reservoir between said chamber and said pump; multiple passage valve means disposed between said chamber and said pump arranged when in one of its positions to connect the inlet of said pump to the outlet of said chamber and to connect the outlet of said pump to outlet piping for the finished product, and when in another position to connect the outlet of said pump directly to its inlet; valve means operable to connect the outlet of said mill to said reservoir; and means for restricting the flow of the product to be milled into said chamber to a rate less than the rate at which said first named gear pump is endeavoring to draw the product from the outlet of the chamber, thereby creating a vacuum in said chamber and effecting removal of entrained gases from the product.

8. In a milling and deaerating system: a mill having a closed milling chamber having an inlet and an outlet; pump means having its inlet connected to the outlet of said chamber for applying a continuous suction to the outlet of said chamber; an auxiliary reservoir between said chamber and said pump; multiple passage valve means disposed between said chamber and said pump arranged when in one of its positions to connect the inlet of said pump to the outlet of said chamber and to connect the outlet of said pump to outlet piping for the finished product; means for connecting the outlet of said mill to said reservoir; and means for restricting the flow of the product to be milled into said chamber so that the system between said pump and said restricting means will be held under vacuum and removal of entrained gases from the product will be effected.

References Cited in the file of this patent

UNITED STATES PATENTS

| | | |
|---|---|---|
| Re. 16,191 | Povey | Oct. 27, 1925 |
| 1,004,515 | Willman | Sept. 26, 1911 |
| 1,216,383 | West | Feb. 20, 1917 |
| 1,469,896 | Cox | Oct. 9, 1923 |
| 1,483,742 | Nicol | Feb. 12, 1924 |
| 1,624,567 | Teague | Apr. 12, 1927 |
| 1,666,640 | Cuniff | Apr. 17, 1928 |
| 1,671,868 | McCougan et al. | May 29, 1928 |
| 1,781,435 | Carper | Nov. 11, 1930 |
| 2,125,245 | McRay | July 26, 1938 |
| 2,403,914 | Eppenbach | July 16, 1946 |
| 2,660,259 | Morehouse | Nov. 24, 1953 |
| 2,741,326 | Brown et al. | Apr. 10, 1956 |